(12) United States Patent
Hwang et al.

(10) Patent No.: US 6,570,701 B1
(45) Date of Patent: May 27, 2003

(54) LONG-BAND LIGHT SOURCE FOR TESTING OPTICAL ELEMENTS USING FEEDBACK LOOP

(75) Inventors: Seong-Tank Hwang, Kyonggi-do (KR); Soo-Young Yoon, Kyonggi-do (KR); Rae-Sung Jung, Kyonggi-do (KR); Jeong-Moo Kim, Kyonggi-do (KR); Sung-Jun Kim, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 193 days.

(21) Appl. No.: 09/624,245

(22) Filed: Jul. 24, 2000

(30) Foreign Application Priority Data

Jul. 22, 1999 (KR) .............................................. 99/29826

(51) Int. Cl.[7] .............................................. H04B 10/12
(52) U.S. Cl. ................................ 359/341.1; 359/341.1; 359/341.2; 359/341.3; 359/341.4
(58) Field of Search ....................... 372/6, 43; 359/341, 359/337.1, 160

(56) References Cited

U.S. PATENT DOCUMENTS 5,191,586 A * 3/1993 Huber .............................. 372/6
5,491,581 A * 2/1996 Roba ............................ 359/341

(List continued on next page.)

FOREIGN PATENT DOCUMENTS

| JP | 5-509202 | 12/1993 |
| JP | 7-123056 | 5/1995 |
| JP | 10-294510 | 11/1998 |
| WO | WO 92/02061 | 2/1992 |

OTHER PUBLICATIONS

Office Communication issued by the Japanese Patent Office mailed Sep. 3, 2002.
Report of Electronics Information Communication Society (1998, C–3–6, p. 140),entitled "1.58 $\mu$m–band Er–doped fiber amplifier by additional 1.55 $\mu$m–band light injection", written by Sugaya et al.
Electronics Letters vol. 28 No.20 (1992, p. 1924–1925), entitled "Low Noise Operation of $Er^{3+}$ Doped Silica Fibre Amplifier Around 1.6 $\mu$m", written by Massicott et al.

Primary Examiner—Paul Ip
Assistant Examiner—Phillip Nguyen
(74) Attorney, Agent, or Firm—Robert E. Bushnell, Esq.

(57) ABSTRACT

A long-band (L-band) light source capable of testing the characteristics of optical elements using a feedback loop in a fiber amplifier of an optical communication system. In the fiber amplifier including (a) a rare earth doped fiber as an amplification medium, (b) forward and backward pump laser diodes, positioned on front and rear ends of the rare earth doped fiber, for generating and providing pumping lights to the rare earth doped fiber, (c) first wavelength selective couplers for providing the pumping lights from the forward and backward pump laser diodes to the rare earth doped fiber, and (d) optical isolators, inserted between front and rear ends of the first wavelength selective couplers, respectively, for intercepting backward lights reflected from input and output terminals of the fiber amplifier, the L-band light source comprises a feedback loop for making a seed beam incident to the rare earth doped fiber or making an amplified spontaneous emission (ASE) incident again to the rare earth doped fiber to reuse the seed beam or the ASE as the L-band light source for testing the optical elements, second wavelength selective couplers, provided between the optical isolators and the first wavelength selective couplers, respectively, for making the seed beam incident to the feedback loop or extracting and providing the ASE to the feedback loop, and a forward optical isolator, connected to the feedback loop, for intercepting a backward propagation of the seed beam or the ASE. The L-band light source can accurately test the characteristics of various kinds of optical elements used for optical communications.

17 Claims, 4 Drawing Sheets

U.S. PATENT DOCUMENTS

| | | | |
|---|---|---|---|
| 5,500,764 A | * | 3/1996 | Armitage et al. ............ 359/341 |
| 5,506,724 A | | 4/1996 | Shimizu et al. |
| 5,537,244 A | * | 7/1996 | Fukushima et al. .... 359/341.43 |
| 5,623,362 A | * | 4/1997 | Mitsuda et al. ............. 359/341 |
| 5,745,583 A | | 4/1998 | Inagaki et al. |
| 5,861,973 A | * | 1/1999 | Inagaki et al. ......... 359/341.41 |
| 5,920,424 A | * | 7/1999 | Espindola et al. .......... 359/341 |
| 5,991,068 A | * | 11/1999 | Massicott et al. ............ 359/337 |
| 6,011,645 A | * | 1/2000 | Hong ......................... 359/341 |
| 6,025,947 A | * | 2/2000 | Sugaya et al. .............. 359/160 |
| 6,377,394 B1 | * | 4/2002 | Drake et al. ........... 359/341.41 |
| 6,404,540 B1 | * | 6/2002 | Hwang et al. ........... 359/341.1 |
| 2001/0012147 A1 | * | 8/2001 | Lutz et al. ............... 359/337.2 |

* cited by examiner

LONG-BAND LIGHT SOURCE FOR TESTING OPTICAL ELEMENTS USING FEEDBACK LOOP

This application makes reference to, incorporates the same herein, and claims all benefits accruing under 35 U.S.C. §119 from an application for Wide Band Light Source For Testing Optic Elements Using Feedback Loop earlier filed in the Korean Industrial Property Office on the Jul. 22, 1999 and there duly assigned Serial No. 99-29826.

BACKGROUND OF THE INVENTION

1. Field of the Invention

The present invention relates to a light source for testing the characteristics of an optical element used in optical communications, and more particularly to a wide-band or long-band light source for testing an optical element in a fiber amplifier.

2. Description of the Related Art

At present, as the demand for communications is increased, a wavelength division optical communication system has been widely used. Also, researches for a fiber amplifier that can accommodate more channels have been actively made.

In a wavelength division multiplexing (WDM) communication system using multiple channels, the channel spacing generally used is 0.8 nm, and the number of channels is increased to 8, 16, 32, 40, 64, etc. The wavelength band in the range of 1528 nm≈1562 nm, which is the amplification band of the existing erbium doped fiber amplifier (EDFA), can be used until the number of channels reaches 40, but a new wavelength band is required if the channel number is increased over 64.

If the channel spacing is determined to be 0.4 nm in the existing wavelength band, the number of channels that can be used is increased up to 80 channels, but many technical difficulties exist due to a nonlinear phenomenon, etc. Accordingly, research regarding the wavelength band in the range of 1575 nm≈1605 nm, which can be amplified by the erbium doped fiber amplifier (EDFA), have been actively progressed. With this trend, a light source having a wide wavelength band is required for testing various kinds of optical elements used for optical communications, and especially optical elements used for a fiber amplifier. Especially, when using the fiber amplifier in the WDM optical communication system, its wavelength band is in the range of 1520 nm≈1620 nm, and thus a light source capable of accurately testing various kinds of optical elements in this band is required.

FIG. 1 is a view illustrating the construction of a long-band light source using a general EDFA. Referring to FIG. 1, the conventional long-band light source using the fiber amplifier comprises optical isolators 100 and 104 for intercepting a backward propagating light, an erbium doped fiber (EDF) 102 as an amplification medium, and wavelength selective couplers (WSC) 101 and 103 for making pumping lights from pump light sources (i.e., pump laser diodes) 105 and 106 incident to EDF 102. The output characteristics of the long-band light source as constructed above are shown as a dotted curve in FIG. 4. The source output strength of the long-band light source is low.

Known apparatuses, incorporated herein by reference, for controlling the gain of an EDFA are disclosed in U.S. Pat. No. 5,606,724 to Katsuhiro Shimizu et al. entitled Gain Controllable Optical Amplifier And Applications Thereof, and U.S. Pat. No. 5,745,283 to Shinya Inagaki et al. entitled Method And Apparatus For Controlling Optical Amplifier Used For Optically Amplifying Wavelength-Division Multiplexed Signal.

When using a white light source among the conventional light sources, the strength of light output from the white light source is weak, and there exist limitations in testing the performance of optical elements accurately. Also, when using an amplified spontaneous emission (ASE), the difference between the light strengths according to the wavelengths becomes great, and there exist problems in testing an absorption spectrum of the EDF. If the light strengths are greatly different according to the wavelengths when the absorption spectrum is tested by making a weak light signal incident to the EDF, the light strength becomes too high in a specified wavelength, while the light strengths become too low in other wavelengths, and this causes a testing error to occur.

Specifically, at the wavelength having a significant light strength, the light absorbs energy, and excites a longer wavelength. Thus, a pure absorption spectrum cannot be effected at the long wavelength having a lesser light strength. Also, if the light strength is small, it deviates from the testing sensitivity of a spectrum analyzer, and the test itself becomes impossible.

SUMMARY OF THE INVENTION

Accordingly, the present invention has been made in an effort to solve the problems occurring in the related art, and an object of the present invention is to provide a long-band (L-band) light source which has a high light strength and a small source output difference for each wavelength to test the characteristics of optical elements used in a fiber amplifier and optical communications.

It is another object of the present invention to provide a L-band light source which uses a feedback loop to increase the output strength of a L-band in a light source using an ASE.

In order to achieve the above objects, according to the present invention, there is provided a L-band light source for testing optical elements using a feedback loop in a fiber amplifier including a rare earth doped fiber as an amplification medium, forward and backward pump laser diodes, positioned on front and rear ends of the rare earth doped fiber, for generating and providing pumping lights to the rare earth doped fiber, first wavelength selective couplers for providing the pumping lights from the forward and backward pump laser diodes to the rare earth doped fiber, and optical isolators, inserted between front and rear ends of the first wavelength selective couplers, respectively, for intercepting backward lights reflected from input and output terminals of the fiber amplifier, the L-band light source comprising a feedback loop for making a seed beam incident to the rare earth doped fiber or making an amplified spontaneous emission (ASE) incident again to the rare earth doped fiber to reuse the seed beam or the ASE as the L-band light source for testing the optical elements, second wavelength selective couplers, provided between the optical isolators and the first wavelength selective couplers, respectively, for making the seed beam incident to the feedback loop or extracting and providing the ASE to the feedback loop, and a forward optical isolator, connected to the feedback loop, for intercepting a backward propagation of the seed beam or a backward propagation of the ASE.

In another aspect of the present invention, there is provided a L-band light source for testing optical elements using a feedback loop in a fiber amplifier including a rare earth doped fiber as an amplification medium, forward and backward pump laser diodes, positioned on front and rear ends of the rare earth doped fiber, for generating and providing pumping lights to the rare earth doped fiber, first wavelength selective couplers for providing the pumping lights from the forward and backward pump laser diodes to the rare earth doped fiber, and optical isolators, inserted between front and rear ends of the first wavelength selective couplers, respectively, for intercepting backward lights reflected from input and output terminals of the fiber amplifier, the L-band light source comprising a feedback loop for making a seed beam incident to the rare earth doped fiber or making an amplified spontaneous emission (ASE) incident again to the rare earth doped fiber to reuse the seed beam or the ASE as the L-band light source for testing the optical elements, second wavelength selective couplers, provided between the optical isolators and the first wavelength selective couplers, respectively, for making the seed beam incident to the feedback loop or extracting and providing the ASE to the feedback loop, and a forward optical isolator, connected to the feedback loop, for intercepting a backward propagation of the seed beam or the ASE.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The preferred embodiments of the present invention will now be explained in detail with reference to the accompanying drawings. In the following description of the present invention, a detailed description of known functions and configurations incorporated herein will be omitted when it may make the subject matter of the present invention rather unclear.

Figure 1:
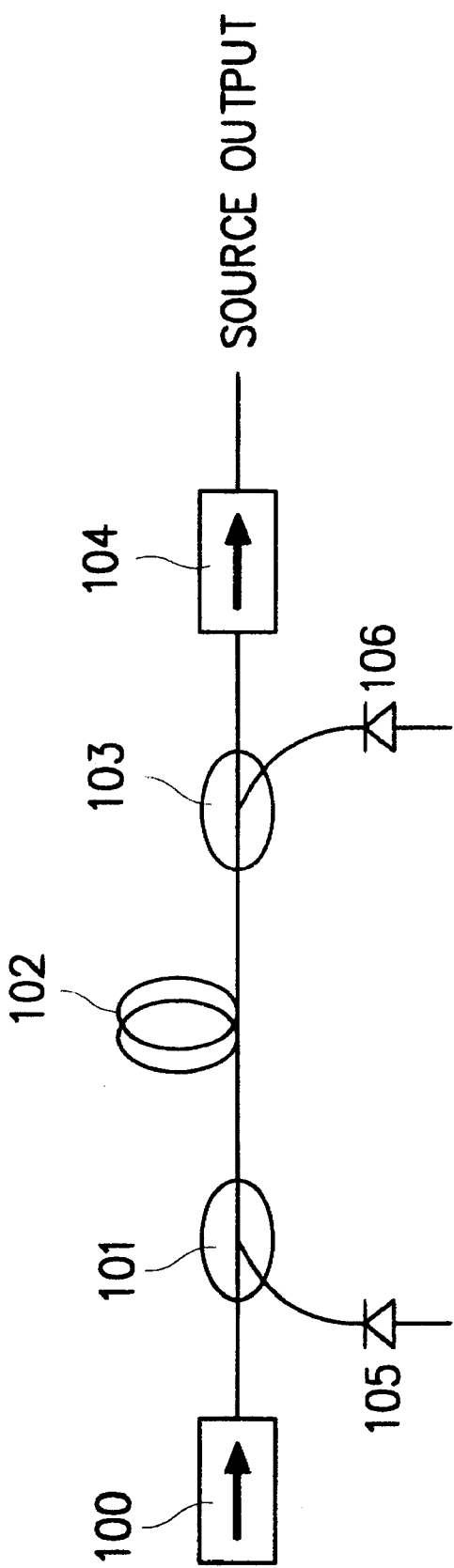
FIG. 1 is a block diagram illustrating the construction of a conventional light source for testing the characteristics of an optical element of a fiber amplifier.
Figure 2:
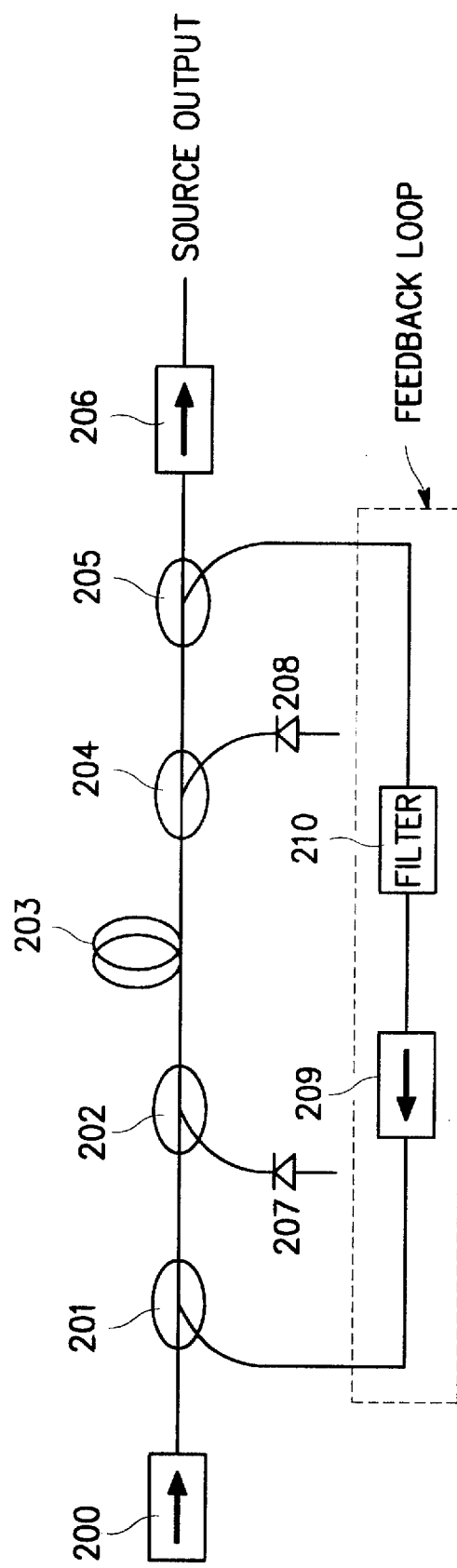
FIG. 2 is a block diagram illustrating the construction of a L-band light source using a feedback loop for testing the characteristics of optical elements of a fiber amplifier according to an embodiment of the present invention.

FIG. 2 is a block diagram illustrating the construction of a L-band light source using a feedback loop for testing the characteristics of optical elements of a fiber amplifier according to an embodiment of the present invention. FIG. 2 shows the construction which increases the L-band output by reusing the seed beam as the L-band light source for testing the optical elements using a feedback loop.

If a conventional band (C-band) is used as the seed beam to compress the ASE having a wide band of wavelength to a light having a narrow band of wavelength, an excited light having a large maximum output which can excite the L-band wavelength can be obtained, and thus the amplification efficiency of the L-band can be increased. Here, the seed beam is a kind of an auxiliary light source, and according to the present invention, it is called the ASE generated when an input light passes through the erbium doped fiber. Also, the seed beam according to the present invention can be used as an independent light source, and also as a light source to which the ASE of the EDFA is fed back.

According to the present invention, the erbium doped fiber is used as the amplification medium. However, the amplification medium according to the present invention is not limited to the erbium doped fiber.

In explaining the present invention, the wavelength of the C-band is in the range of 1520 nm~1570 nm, and the wavelength of the L-band is in the range of 1570 nm~1620 nm. In other words, the C-band wavelength is called a short wavelength, and the L-band wavelength is called a long wavelength. Referring to FIG. 2, the present invention provides the construction of the light source which increases the output in the L-band by adding the seed beam to the light source for testing the optical elements. Specifically, according to the present invention, an EDF 203 is used as the amplification medium of the light, and optical isolators 200 and 206 are connected to the front and the rear of the light source centering around the EDF 203 to intercept the backward lights. In accordance with the present invention, wavelength selective couplers 202 and 204 are also used to make pumping lights from pump laser diodes 207 and 208 as pump light sources incident to the EDF 203. Here, the pump laser diodes generate the pumping lights having a wavelength of 980 nm or 1480 nm.

In detail, the first wavelength selective couplers 202 and 204 are coupled to the front and rear of the light source centering around the EDF 203, and a forward pump laser diode 207 and a backward pump laser diode 208 are connected to the first wavelength selective couplers 202 and 204, respectively. These pump light sources may be forward or backward pump light sources. Alternatively, only one light source may be used.

Generally, two amplifying operations are effected during the amplifying process performed by the pump light sources 207 and 208 in the fiber amplifier. During this amplifying process of the light, a stimulated emission which effects the amplification of the signal light and a spontaneous emission which is generated irrespective of the signal light are generated. The present invention reuses the ASE generated during the amplifying process of the signal light as the seed beam through the feedback loop.

Figure 3:
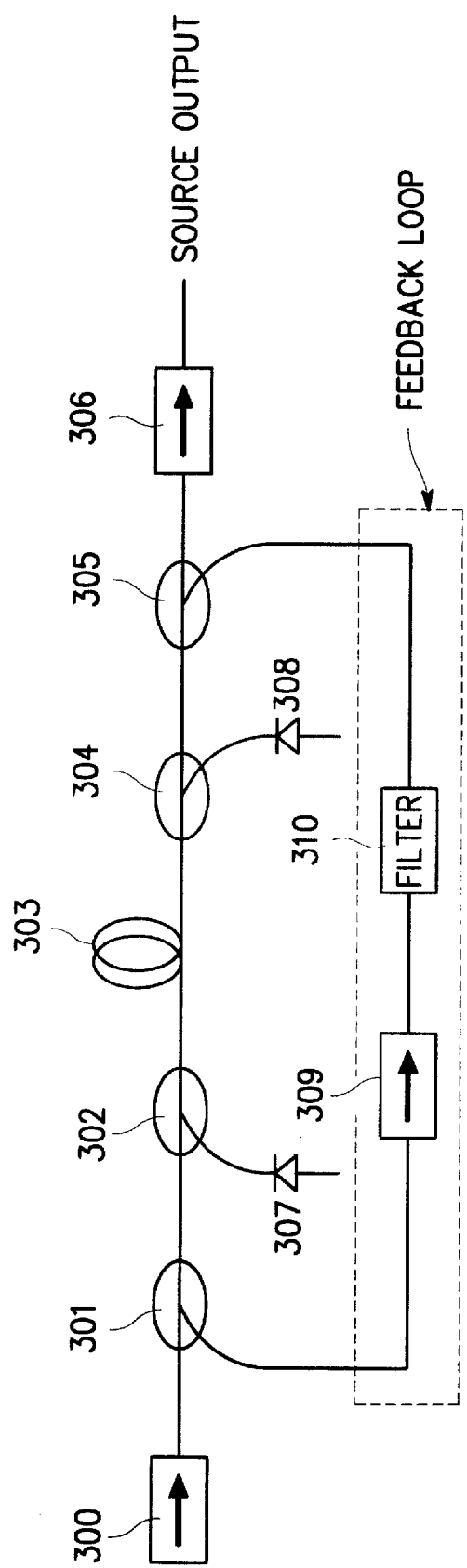
FIG. 3 is a block diagram illustrating the construction of a L-band light source using a feedback loop for testing the characteristics of optical elements of a fiber amplifier according to another embodiment of the present invention.

FIG. 2 shows the construction of a L-band light source for making the seed beam incident in a forward direction of the signal light using the ASE according to an embodiment of the present invention, and FIG. 3 shows the construction of a L-band light source for making the seed beam incident in a backward direction of the signal light using the ASE according to another embodiment of the present invention. According to the constructions of FIGS. 2 and 3, only the structure of the optical isolators 209 and 309 is different from each other, but other elements are identical. The optical isolator 209 illustrated in FIG. 2 means a forward optical isolator for making the seed beam incident in the same direction as the signal light, and the optical isolator 309 illustrated in FIG. 3 means a backward optical isolator for making the seed beam incident in the direction opposite to the direction of the signal light. For convenience sake in explanation, both the constructions of the light sources of FIGS. 2 and 3 will be explained together.

As shown in FIGS. 2 and 3, the present invention uses a feedback loop in order to make a seed beam, and this feedback loop includes filters 210 and 310 for selecting a specified wavelength of the ASE, and a forward optical isolator 209 (illustrated in FIG. 2) or a backward optical isolator 309 (illustrated in FIG. 3) for preventing a feedback beam from propagating in a backward direction. The present invention uses the wavelength selective couplers 201 and 205 (illustrated in FIG. 2) or 301 and 305 (illustrated in FIG. 3) to make the seed beam using the feedback loop and the signal light incident to the amplification medium, and thus the ASE can be fed back using the wavelength selective couplers. The operation of the light source using the feedback loop as constructed above will be explained.

In order to heighten the output in the L-band using the erbium doped fiber amplifier (EDFA), the length of the erbium doped fibers (EDF) 203 and 303 should be sufficiently lengthened. Especially, the length of the EDF 203 and 303 used for the L-band light source is over 10 times longer than the length of the EDF generally used for the EDFA.

According to the present invention, erbium ions of the EDF 203 and 303 excited by the pumping light are spontaneously emitted, and then this spontaneous emission is under the stimulated emission to generate a high output in the C-band wavelength in the range of 1520 nm~1570 nm. The incident forward and backward pumping lights excite the erbium ions. Meanwhile, the ASE of the C-band is absorbed passing through the EDF, and amplifies the light in the L-band wavelength of 1570 nm~1620 nm that is longer than the wavelength of the ASE. Since the wavelength band of the ASE is wide, the peak power for each wavelength is low though the total power is high.

More erbium ions in the EDF 203 and 303 are excited as the peak power of the respective wavelength, rather than the total power of the ASE in the C-band, becomes greater, resulting in that the output of the L-band can be efficiently heightened. Accordingly, if the seed beam in the C-band is used, the C-band wavelength is amplified, and the peak power in the C-band wavelength becomes greater, so that the L-band can be more efficiently amplified. At this time, a specified wavelength can be selected using the filters 210 and 310 for filtering the ASE generated from the EDFA to use the specified wavelength as the seed beam. It is preferable that the filters 210 and 310 are variable wavelength filters for the selective use of the specified wavelength band.

According to the present invention, it is also preferable that the filter 210 has a forward wavelength of 1560 nm, and the filter 310 has a backward wavelength of 1565 nm in order to make the L-band light source the greatest.

Figure 4:
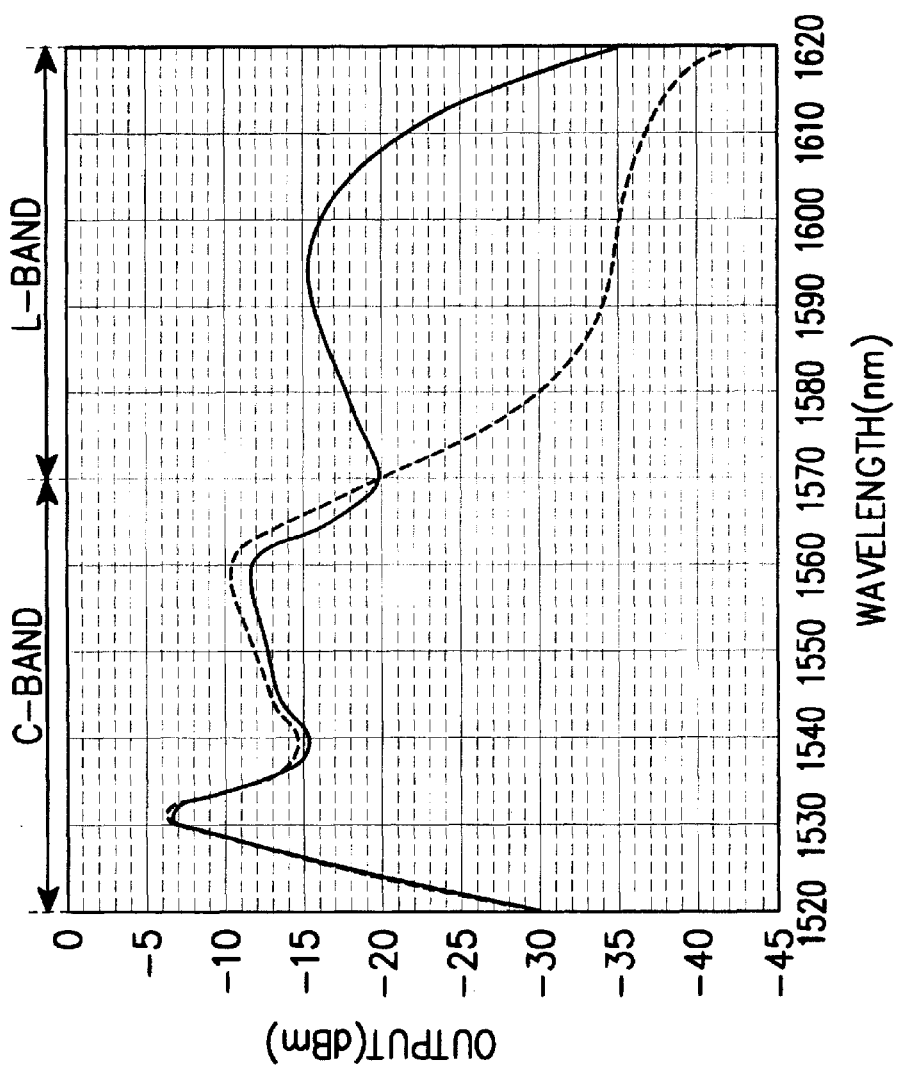
FIG. 4 is a graph illustrating the output characteristics of the L-band light source in the case of using a seed beam and in the case of using no seed-beam.

FIG. 4 is a graph illustrating the output characteristics of the L-band light source in the case of using a seed beam and in the case of using no seed-beam. As shown in FIG. 4, when the seed beam of the ASE is used, the source output according to the present invention in the wavelength of 1600 nm is increased over 18 dB at maximum in comparison to that of the conventional light source. As a result, the source output of the L-band light source according to the present invention is greatly increased. In FIG. 4, the solid line represents the output of the L-band light source according to the present invention, and the dotted line represents the output of the conventional L-band light source. The horizontal axis represents the wavelength band, and the vertical axis represents the output characteristics.

As described above, according to the present invention, the L-band light source is simply implemented using the feedback loop, and thus the characteristics of various kinds of optical elements used for optical communications can be more accurately tested. Also, it is not required to use a separate seed-beam light source independently constructed since the ASE of the EDFA is reused.

While this invention has been described in connection with what is presently considered to be the most practical and preferred embodiments, it is to be understood that other modifications thereof may be made without departing from the scope of the invention. Thus, the invention should not be limited to the disclosed embodiment, but should be defined by the scope of the appended claims and their equivalents.

What is claimed is:

1. A long-band (L-band) light source for testing optical elements in a fiber amplifier including (a) a rare earth doped fiber as an amplification medium, (b) forward and backward pump laser diodes, positioned on front and rear ends of the rare earth doped fiber, for generating and providing pumping lights to the rare earth doped fiber, (c) first wavelength selective couplers for providing the pumping lights from the forward and backward pump laser diodes to the rare earth doped fiber, and (d) optical isolators, inserted between front and rear ends of the first wavelength selective couplers, respectively, for intercepting backward lights reflected from input and output terminals of the fiber amplifier, the L-band light source comprising:

a feedback loop for making a seed beam incident to the rare earth doped fiber or making an amplified spontaneous emission (ASE) incident again to the rare earth doped fiber to reuse the seed beam or the ASE as the L-band light source for testing the optical elements;

second wavelength selective couplers, provided between the optical isolators and the first wavelength selective couplers, respectively, for making the seed beam incident to the feedback loop or extracting and providing the ASE to the feedback loop; and a forward optical isolator connected between the second wavelength selective couplers and being disposed in the feedback loop, for intercepting a backward propagation of the seed beam or the ASE.

2. The L-band light source as claimed in claim 1, further comprising a filter, additionally provided in the feedback loop and connected between one of said second wavelength selective couplers and said forward optical isolator, for filtering a wavelength of the ASE or the seed beam.

3. The L-band light source as claimed in claim 2, wherein the filter is a wavelength variable filter.

4. The L-band light source as claimed in claim 2, wherein the filter filters a wavelength of 1560 nm.

5. The L-band light source as claimed in claim 1, wherein the rare earth doped fiber comprises erbium.

6. A long-band (L-band) light source for testing optical elements in a fiber amplifier including (a) a rare earth doped fiber as an amplification medium, (b) forward and backward pump laser diodes, positioned on front and rear ends of the rare earth doped fiber, for generating and providing pumping lights to the rare earth doped fiber, (c) first wavelength selective couplers for providing the pumping lights from the forward and backward pump laser diodes to the rare earth doped fiber, and (d) optical isolators, inserted between front and rear ends of the first wavelength selective couplers, respectively, for intercepting backward lights reflected from input and output terminals of the fiber amplifier, the L-band light source comprising:

a feedback loop for making a seed beam incident to the rare earth doped fiber or making an amplified spontaneous emission (ASE) incident again to the rare earth doped fiber to reuse the seed beam or the ASE as the L-band light source for testing the optical elements;

second wavelength selective couplers, provided between the optical isolators and the first wavelength selective couplers, respectively, for making the seed beam incident to the feedback loop or extracting and providing the ASE to the feedback loop; and a forward optical isolator disposed within the feedback loop and connected between the second wavelength selective couplers, for intercepting a backward propagation of the seed beam or the ASE.

7. The L-band light source as claimed in claim 6, further comprising a filter, additionally disposed in the feedback loop and connected between one of said second wavelength selective couplers and said forward optical isolator, for filtering a wavelength of the ASE or the seed beam.

8. The L-band light source as claimed in claim 7, wherein the filter is a wavelength variable filter.

9. The L-band light source as claimed in claim 7, wherein the filter filters a wavelength of 1565 nm.

10. The L-band light source as claimed in claim 6, wherein the rare earth doped fiber utilizes erbium.

11. A long-band (L-band) light source for testing optical elements in a fiber amplifier including a rare earth doped fiber as an amplification medium positioned between a first wavelength selective coupler for providing pumping light from a forward pump laser diode and a second wavelength selective coupler for providing pumping light from a backward pump laser diode, the L-band light source comprising:

a first optical isolator;

a third wavelength selective coupler disposed between and coupled to said first optical isolator and said first wavelength selective coupler;

a second optical isolator;

a fourth wavelength selective coupler disposed between and coupled to said second optical isolator and said second wavelength selective coupler;

a feedback loop disposed between said third and fourth selective couplers for providing an amplified spontaneous emission (ASE) incident again to the rare earth doped fiber to reuse the ASE as the L-band light source for testing the optical elements, said feedback loop comprising a third optical isolator coupled to said third wavelength selective coupler and a filter coupled between said third optical isolator and said fourth wavelength selective coupler.

12. The L-band light source as claimed in claim 11, wherein said filter is a wavelength variable filter for filtering a wavelength of the ASE .

13. The L-band light source as claimed in claim 12, wherein said third optical isolator is a forward optical isolator.

14. The L-band light source as claimed in claim 13, wherein the filter filters a forward wavelength of 1560 nm.

15. The L-band light source as claimed in claim 12, wherein said third optical isolator is a backward optical isolator.

16. The L-band light source as claimed in claim 15, wherein the filter filters a backward wavelength of 1565 nm.

17. The L-band light source as claimed in claim 11, wherein the rare earth doped fiber comprises erbium.

* * * * *